United States Patent [19]
Williams

[11] 4,153,642
[45] May 8, 1979

[54] RUBBER COMPOSITIONS COMPRISING DIBROMOPOLYBUTADIENE AND A SOLID POLYAMIDE

[75] Inventor: Charles E. Williams, Bloomfield Hills, Mich.

[73] Assignee: Grow Chemical Corp., New York, N.Y.

[21] Appl. No.: 766,204

[22] Filed: Feb. 7, 1977

[51] Int. Cl.$^2$ .................... C08L 9/00; C08L 63/10; C08L 77/06
[52] U.S. Cl. ................... 260/837 R; 260/29.8; 260/31.8 M; 260/31.8 N; 260/33.6 EP; 260/37 EP; 260/39 M; 260/857 D; 260/857 L; 428/458; 428/474; 428/479; 428/413; 428/418
[58] Field of Search ........... 260/837 R, 857 L, 857 D; 428/413, 418, 458

[56] References Cited

U.S. PATENT DOCUMENTS

| | | | |
|---|---|---|---|
| 2,379,413 | 7/1945 | Bradley | 260/404.5 |
| 2,450,940 | 10/1948 | Cowan et al. | 260/404.5 |
| 2,570,895 | 10/1951 | Wilson | 260/857 D |
| 2,903,437 | 9/1959 | Van Epp | 260/41.5 |
| 3,311,515 | 3/1967 | Weller et al. | 156/71 |
| 3,316,187 | 4/1967 | Grosner et al. | 260/2.5 |
| 3,370,104 | 2/1968 | O'Brien et al. | 260/837 |
| 3,529,036 | 9/1970 | Edwards | 260/835 |
| 3,632,795 | 1/1972 | Thomas | 260/47 |
| 3,639,657 | 2/1972 | Moran et al. | 260/47 |
| 3,842,023 | 10/1974 | Anagnostoli er al. | 260/23.7 |
| 4,018,739 | 4/1977 | Okamoto et al. | 260/51 R X |
| 4,026,933 | 5/1977 | Edwards et al. | 260/33.6 |
| 4,108,749 | 8/1978 | Onizawa | 260/78 A |

OTHER PUBLICATIONS

Poly Sar. . . Bulletin D-1.
Epoxy Status Report, Apr. 1975.
Rubber Age, Feb. 1972, Dolezal et al.
Ciba Product Bulletin, Latent Hardeners . . . Supplementary Data.

*Primary Examiner*—Howard E. Schain
*Attorney, Agent, or Firm*—Burton, Parker & Schramm

[57] ABSTRACT

Described is a rubber composition comprising dibromopolybutadiene and the reaction product between aliphatic polyamines and polycarboxylic acids or anhydrides. The compositions are preferably used as low temperature adhesives or sealers.

14 Claims, No Drawings

RUBBER COMPOSITIONS COMPRISING DIBROMOPOLYBUTADIENE AND A SOLID POLYAMIDE

BACKGROUND OF THE INVENTION

In the fabrication of adhesives and coating compositions, it is preferred that these compositions have the ability to cure at low temperatures thereby resulting in an energy savings. Additionally, these compositions should have the ability of a long pot life and therefore have substantial stability, preferably being one-component; that is, all of the reactant components are included in one place. Liquid rubber compositions containing dibromopolybutadiene are known. However, extended pot life and low curing temperatures have not been achieved previously for said compositions.

SUMMARY OF THE INVENTION

The invention is concerned with rubber compositions comprising:
A. Dibromopolybutadiene;
B. A polyamide which is the reaction product of a polyamine and a polycarboxylic acid or anhydride. Preferably, the rubber composition also contains additional amounts of an epoxy resin. The polyamide acts as a curing catalyst.

DESCRIPTION OF PREFERRED EMBODIMENTS

Dibromopolybutadiene is a known composition and is generally available in the trade usually as a liquid.

The reaction product of the polyamine and the polycarboxylic acid or anhydride are also known products. The preparation of these products is described in U.S. Pat. No. 3,639,657 which is hereby incorporated by reference.

Preferably, the reaction product is prepared by a condensation reaction to produce a polyamide wherein the polyamine is comprised of saturated aliphatic amines. The polyamines are generally of the structure $(R_1)(R_2)N-R_3-N(R_4)(R_5)$ wherein $R_1$, $R_2$, $R_4$, and $R_5$ are independently selected from the groups consisting of hydrogen and alkyl of 1 to 6 carbon atoms, and $R_3$ is selected from the group consisting of (i) saturated alkylene groups from 2 to 8 carbon atoms; (ii) a cyclic structure including the amino groups such as piperazine and the like; (iii) compounds of the structure $-(CH_2)_a-N(R_6)-(CH_2)_b-$ or

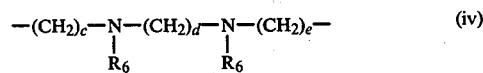

(iv)

wherein a, b, c, d, and e independently are intergers ranging from 1 to 4, and $R_6$ may be hydrogen or alkyl of 1 to 6 carbon atoms.

Suitable amines are ethylene diamine, diethylene triamine, triethylene tetraamine, 1,6-diamino hexane, 1,3-diamino propane, imino-bis (propyl amine), methyl imino-bis (propyl amine) and the like.

The polycarboxylic acid or anhydride may be saturated aliphatic or cycloaliphatic or aromatic and may contain from 3 to 12 carbon atoms such as citric acid, phthalic anhydride, hexahydrophthalic anhydride, tetrahydrophthalic anhydride, methyl-tetrahydrophthalic anhydride and the saturated aliphatic polycarboxylic acids and anhydrides such as oxalic, malonic, succinic, glutaric, adipic, pimelic, suberic, azelaic, sebacic and the like.

Most preferably, the polyamide that is employed is one that is a low molecular weight product preferably less than 1,000, even more preferably less than 500. Additionally, the reaction product is preferably water soluble.

The use of the rubber composition of the present invention is preferably employed with an epoxy resin. The epoxy resin is any one of the normally commercially available epoxy resins such as epoxy resins of the bisphenol-A type, dimeric acid type, polyalkylene ether type, novolak type, the polyhydric alcohol type as the reaction product of bisphenol and epihalohydrin and the like.

It is to be appreciated that various inert materials are added to improve the properties of the composition such as reinforcing agents, pigments, plasticizers and the like.

It should also be appreciated that other promoting catalysts or agents can be added to increase the curing speed of the composition.

During the utilization of the composition of the present invention, the adhesive may be applied to one or two substrates which are to be adhered together. The substrates may then be affixed to each other and the adhesive subsequently cured. The substrates are normally metallic substrates or one is trying to secure one substrate to a metallic substrate such as that as normally occurs in the transportation industry as in automobiles, trucks and the like. The substrates may be metal as zinc, iron, or aluminum, wood, glass, plastic, as synthetic resins and the like.

The amides that are used as curing catalysts for the present composition have the particular advantage that the total composition (one package) is stable at room temperature, and therefore can be shipped and handled with little or no difficulty. It is only when the temperature approximates 65° C. and above that the catalyst melts and is dissolved into the butadiene component thereby causing the catalytic reaction to occur and the vulcanization or curing of the rubber composition.

The components of the invention can be described as follows:

| Materials | Broad Range (Parts/Wt.) | Preferred Composition (Parts/Wt.) |
|---|---|---|
| Dibromopolybutadiene (DBPB) | 100 | 100 |
| Polyamide catalyst | 3–200 | 34 |
| Epoxy resin | 0–300 | 24 |

Another area where the composition of the present invention may be employed is in the area of a sealant, such as a low cost sealant that may be applied to seal various crevices, such as the underbody of an automobile. Because the polyamide catalyst is a solid at ambient temperature and pressure, there is virtually no curing of the DBPB. The product is very stable at ambient.

If the DBPB polyamide composition were blended with appropriate diluents, than a low cost auto undercoating could be produced. The coating can be applied at any desired thickness although 10-20 mils is preferred.

The diluents that may be employed range in an amount from about 1 to about 5 parts of diluent to one part of DBPB.

Suitable diluents are those that are relatively nonreactive and stable with respect to DBPB and the polyamide such as asphalt such as one having a softening point of 85°–110° F., oil such as naphthenic, aromatic or paraffinic oil, hydrocarbon resins as terpene derivatives, and the like.

It is to be appreciated that the compositions of the present invention, regardless of end use, may have added thereto various plasticizers, thermal and light degradation stabilizers, pigments, reinforcing materials, solvents and the like.

Suitable plasticizers that may be used are those that do not dissolve the polyamide catalyst until its melting point has been reached such as diisodecyl phthalate, dioctly phthalate, butyl benzyl phthalate, and the like.

Suitable stabilizers may be lead phthalate, organic phosphates, zinc and its oxides, and various other vinyl stabilizers as long as they do not interfere with the adhesion of the composition to the substrate.

Suitable pigments and fillers may be calcium carbonate, titanium dioxide, barium-calcium type, calcium magnesium carbonate, and the like.

Any solvent may be used as long as it does not dissolve the polyamide catalyst for the catalyst will cause premature curing. Therefore, solvents such as ketones and alcohols should not be used.

Having described the invention in general terms, listed below are further embodiments of the invention wherein all temperatures are in degrees Fahrenheit and all parts are parts by weight.

EXAMPLE 1.

An adhesive formulation was prepared as follows:
RTV-1500 (Trademark of Polysar Corporation for dibromopolybutadiene) 60 parts by weight,
Epoxy resin (reaction product of bisphenol and epichlorhydrin) 20.5 parts;
Polyamide catalyst (Reaction product of phthalic anhydride and diethylene triamine; the product has a melting point of 102°–103° C. and an equivalent weight of 93) 14.5 parts by weight.
Bentone (Trademark of National Lead for a gelling agent) 12.4 parts by weight.
Calcium magnesium carbonate 100 parts by weight.

The mixture is blended together and is stable at room temperature for extended periods of time. The mixture is applied to a steel substrate and heated to about 130° C. thereby melting the polyamide resulting in a cured, hard adhering coating.

Texanol isobutyrate solvent 50 parts by weight may be used to dilute the above composition in order to assist in applying the adhesive.

EXAMPLE 2.

A sealing composition was formulated as follows:

| | |
|---|---|
| asphalt | 200 parts by weight |
| Naphthenic oil | 200 parts by weight |
| DBPB | 100 parts by weight |
| HY 940* | 17 parts |

*Trademark of Ciba-Geigy for a mixture of an epoxy resin (10 parts) of the bisphenol epichlorohydrin type and polyamide catalyst (7 parts) of Example 1.

The above composition was stable at room temperature for an extended period of time. When the composition was applied to the underbody of a vehicle, the vehicle heated to 130° C., the polyamide catalyst dissolved, resulting in a hard, adherent sealing composition.

The consistency of the coating composition can be varied from hard to soft and rubbery by adding more diluent and less epoxy material to the sealing composition.

It is to be appreciated that variations on the invention can be made without departing from the scope of the appended claims such as using the sealing or undercoating composition wherever vinyl sealing compositions may be used for better chip resistance can be achieved by the oil extended sealing compositions described herein.

What is claimed is:

1. A one package rubber composition consisting essentially of a mixture of dibromopolybutadiene and an effective catalytic amount of the reaction product of a saturated aliphatic polyamine and a saturated aliphatic carboxylic acid or anhydride or an aromatic or cycloaliphatic acid or anhydride wherein the reaction product is an amide that is solid at ambient temperature and pressure.

2. The composition of claim 1 further comprising an epoxy resin in an amount ranging from about 10 to about 300 parts by weight per 100 parts by weight of dibromopolybutadiene.

3. The composition of claim 1 wherein the polyamide product has a molecular weight of less than 1,000.

4. The composition of claim 1 wherein the polyamide has a molecular weight of less than 500.

5. The composition of claim 1 wherein the polyamide is a solid and is present in an amount ranging from about 3 parts by weight to 200 parts by weight per 100 parts by weight of dibromopolybutadiene.

6. The composition of claim 1 further comprising a diluent present in an amount ranging from about 1 to about 5 parts by weight of diluent per 1 part by weight of dibromopolybutadiene.

7. A one package adhesive or sealing composition consisting essentially of a mixture of dibromopolybutadiene and an effective catalytic amount of the reaction product of a saturated aliphatic polyamine and a saturated aliphatic carboxylic acid or anhydride or an aromatic or cycloaliphatic acid or anhydride wherein the reaction product is an amide that is solid at ambient temperature and pressure.

8. The composition of claim 7 wherein the polyamide is a solid and is present in an amount ranging from about 3 parts of weight to 200 parts by weight per 100 parts by weight of dibromopolybutadiene.

9. The composition of claim 7 wherein a diluent is present in an amount ranging from about 1 to about 5 parts by weight of diluent per 1 part by weight of dibromopolybutadiene.

10. A method of adhering two substrates to each other comprising applying the composition of claim 1 to a first substrate at room temperature;
affixing the second substrate to the first substrate; and curing said composition by heating said substrates to a temperature of at least 65° C.

11. The process of claim 10 wherein the polyamide has a molecular weight less than 1,000.

12. The process of claim 10 wherein the polyamide has a molecular weight less than 500.

13. The process of claim 10 wherein the composition further comprises an epoxy resin in amount ranging from about 10 to about 300 parts by weight (PBW) per 100 PBW of dibromopolybutadiene.

14. The cured product on the substrates of claim 10.

* * * * *

UNITED STATES PATENT OFFICE
CERTIFICATE OF CORRECTION

Patent No. 4,153,642  Dated May 8, 1979

Inventor(s) Charles E. Williams

It is certified that error appears in the above-identified patent and that said Letters Patent are hereby corrected as shown below:

Column 4, Lines 53-67, that is, Claims 10-14, delete.

On the title page, under the Abstract, "14 Claims" should read -- 9 Claims --.

Signed and Sealed this

Sixth Day of November 1979

[SEAL]

Attest:

RUTH C. MASON
Attesting Officer

LUTRELLE F. PARKER
Acting Commissioner of Patents and Trademarks